United States Patent
Colclasure

(10) Patent No.: US 10,044,028 B1
(45) Date of Patent: Aug. 7, 2018

(54) COMPOSITE CATHODE SOLID STATE BATTERY

(71) Applicant: ITN Energy Systems, Inc., Littleton, CO (US)

(72) Inventor: Andrew Colclasure, Morrison, CO (US)

(73) Assignee: ITN ENERGY SYSTEMS, INC., Littleton, CO (US)

(*) Notice: Subject to any disclaimer, the term of this patent is extended or adjusted under 35 U.S.C. 154(b) by 317 days.

(21) Appl. No.: 14/608,813

(22) Filed: Jan. 29, 2015

Related U.S. Application Data

(60) Provisional application No. 61/933,214, filed on Jan. 29, 2014.

(51) Int. Cl.

| | |
|---|---|
| *H01M 4/04* | (2006.01) |
| *H01M 4/36* | (2006.01) |
| *H01M 4/62* | (2006.01) |
| *H01M 4/133* | (2010.01) |
| *H01M 4/525* | (2010.01) |
| *H01M 4/58* | (2010.01) |
| *H01M 4/131* | (2010.01) |
| *H01M 4/587* | (2010.01) |
| *H01M 4/136* | (2010.01) |
| *H01M 4/02* | (2006.01) |

(52) U.S. Cl.
CPC .......... *H01M 4/364* (2013.01); *H01M 4/131* (2013.01); *H01M 4/133* (2013.01); *H01M 4/136* (2013.01); *H01M 4/525* (2013.01); *H01M 4/587* (2013.01); *H01M 4/5825* (2013.01); *H01M 4/624* (2013.01); *H01M 4/04* (2013.01); *H01M 2004/028* (2013.01)

(58) Field of Classification Search
CPC ...... H01M 4/364; H01M 4/131; H01M 4/133; H01M 4/136; H01M 4/525; H01M 4/5825; H01M 4/587; H01M 4/624; H01M 2004/028; H01M 4/04
See application file for complete search history.

(56) References Cited

U.S. PATENT DOCUMENTS

| | | |
|---|---|---|
| 5,300,373 A | 4/1994 | Shackle |
| 6,139,987 A | 10/2000 | Koo et al. |
| 6,392,387 B1 | 5/2002 | Sage et al. |
| 6,515,787 B1 | 2/2003 | Westfall et al. |
| 6,753,108 B1 | 6/2004 | Hampden-Smith et al. |

(Continued)

OTHER PUBLICATIONS

Electric Power Research Institute, Development of Flexible Electrochromic Films, 1018525, Technical Update, Dec. 2009, EPRI Project Manager: K.R. Amarnath, 2009, 42 pgs.

(Continued)

*Primary Examiner* — Stephen J Yanchuk

(57) ABSTRACT

Selectively annealing one or more materials of a composite cathode occurs through selection of composite cathode material composition, particle shape and size of composite cathode material, microwave waveform, microwave duration, and environment. Electron conductor material and ion conducting material may be annealed in a staged process to substantially reduce cross contamination of resulting electron and ion conducting pathways while increasing the number or electron and ion conducting pathways in a composite cathode.

9 Claims, 9 Drawing Sheets

(56) References Cited

U.S. PATENT DOCUMENTS

| | | |
|---|---|---|
| 6,822,778 B2 | 11/2004 | Westfall et al. |
| 6,856,444 B2 | 2/2005 | Ingalls et al. |
| 6,967,183 B2 | 11/2005 | Hampden-Smith et al. |
| 7,009,750 B1 | 3/2006 | Westfall et al. |
| 7,087,341 B2 | 8/2006 | Hampden-Smith et al. |
| 7,126,091 B1 | 10/2006 | Westfall et al. |
| 7,133,181 B2 | 11/2006 | Greer |
| 7,145,709 B1 | 12/2006 | Westfall et al. |
| 7,215,457 B1 | 5/2007 | Westfall et al. |
| 7,265,890 B1 | 9/2007 | Demiryont |
| 7,265,891 B1 | 9/2007 | Demiryont |
| 7,277,215 B2 | 10/2007 | Greer |
| 7,362,490 B2 | 4/2008 | Park |
| 7,372,610 B2 | 5/2008 | Burdis et al. |
| 7,531,239 B2 | 5/2009 | Demiryont |
| 7,586,667 B2 | 9/2009 | Demiryont |
| 7,593,154 B2 | 9/2009 | Burdis et al. |
| 7,619,804 B1 | 11/2009 | Demiryont |
| 7,666,233 B2 | 2/2010 | Visco et al. |
| 7,704,555 B2 | 4/2010 | Demiryont |
| 7,830,585 B2 | 11/2010 | Widjaja et al. |
| 7,928,021 B2 * | 4/2011 | Kowalski ............ H01L 21/324 257/E21.001 |
| 8,048,571 B2 | 11/2011 | Visco et al. |
| 8,202,649 B2 | 6/2012 | Visco et al. |
| 8,637,996 B2 | 1/2014 | Frey |
| 8,980,485 B2 | 3/2015 | Lanning et al. |
| 9,013,777 B2 | 4/2015 | Frey et al. |
| 9,217,198 B2 | 12/2015 | Berland et al. |
| 9,293,796 B2 | 3/2016 | Lanning et al. |
| 2002/0037756 A1 | 3/2002 | Jacobs et al. |
| 2003/0049517 A1 | 3/2003 | Hampden-Smith et al. |
| 2004/0067417 A1 | 4/2004 | Oosawa et al. |
| 2004/0185336 A1 | 9/2004 | Ito et al. |
| 2006/0001137 A1 | 1/2006 | Hundy et al. |
| 2006/0209383 A1 | 9/2006 | Burdis et al. |
| 2007/0003833 A1 * | 1/2007 | Li ........................ H01M 4/131 429/218.1 |
| 2007/0012244 A1 | 1/2007 | Klaassen |
| 2007/0051620 A1 | 3/2007 | Visco et al. |
| 2007/0103612 A1 | 5/2007 | Lumpkin |
| 2009/0159582 A1 | 6/2009 | Chami et al. |
| 2009/0208671 A1 | 8/2009 | Nieh et al. |
| 2010/0086851 A1 | 4/2010 | Wang et al. |
| 2010/0227214 A1 | 9/2010 | Krasnov et al. |
| 2011/0117417 A1 | 5/2011 | Pitts |
| 2011/0267674 A1 | 11/2011 | Wang et al. |
| 2012/0100440 A1 | 4/2012 | Narula et al. |
| 2012/0214064 A1 | 8/2012 | Sabi |
| 2012/0244412 A1 | 9/2012 | Pascaly et al. |
| 2013/0078535 A1 | 3/2013 | Aizawa |
| 2013/0171527 A1 * | 7/2013 | Lanning ................ H01M 4/861 429/405 |
| 2013/0224590 A1 | 8/2013 | Divigalpitiya |
| 2013/0266741 A1 * | 10/2013 | Song ................... H01M 4/0426 427/559 |
| 2014/0227609 A1 | 8/2014 | Frey et al. |
| 2015/0072231 A1 | 3/2015 | Kudoh et al. |
| 2015/0333307 A1 * | 11/2015 | Thokchom ............ H01M 2/145 429/144 |

OTHER PUBLICATIONS

PCT International Search Report and Written Opinion in International Application PCT/US2012/056685, dated Nov. 30, 2012, 8 pgs.

U.S. Appl. No. 13/717,364, Notice of Allowance dated Sep. 18, 2013, 9 pgs.

U.S. Appl. No. 13/731,554, Office Action dated Aug. 1, 2014, 7 pgs.

U.S. Appl. No. 13/758,468, Notice of Allowance dated Jun. 9, 2014, 9 pgs.

U.S. Appl. No. 13/758,468, Ex Parte Quayle Action mailed Sep. 18, 2014, 7 pgs.

U.S. Appl. No. 13/758,468, Amendment and Response filed Oct. 14, 2014, 12 pgs.

U.S. Appl. No. 13/717,215, Office Action dated Jan. 8, 2015, 17 pgs.

U.S. Appl. No. 13/758,468, Notice of Allowance dated Dec. 22, 2014, 9 pgs.

U.S. Appl. No. 13/731,554, Amendment and Response filed Oct. 24, 2014, 5 pgs.

U.S. Appl. No. 13/731,554, Notice of Allowance dated Nov. 7, 2014, 7 pgs.

U.S. Appl. No. 13/731,554, Amendment and Response filed after Allowance on Feb. 13, 2015, 5 pgs.

U.S. Appl. No. 13/544,391, Office Action dated Mar. 25, 2015, 14 pgs.

U.S. Appl. No. 13/717,215, Amendment and Response filed Apr. 8, 2015, 18 pgs.

U.S. Appl. No. 13/717,215, Office Action dated Apr. 17, 2015, 17 pgs.

U.S. Appl. No. 13/717,215, Amendment and Response filed Jul. 17, 2015, 11 pgs.

U.S. Appl. No. 13/717,215, Amendment and Response filed Aug. 24, 2015, 6 pgs.

U.S. Appl. No. 13/717,215, Ex Parte Quayle Action mailed Sep. 3, 2015, 5 pgs.

U.S. Appl. No. 13/717,215, Response filed after Quayle Action filed Nov. 3, 2015, 5 pgs.

U.S. Appl. No. 13/717,215, Notice of Allowance dated Nov. 12, 2015, 8 pgs.

U.S. Appl. No. 13/544,391, Amendment and Response filed Jun. 25, 2015, 11 pgs.

U.S. Appl. No. 13/544,391, Notice of Allowance dated Aug. 14, 2015, 9 pgs.

U.S. Appl. No. 14/446,129, Office Action dated Mar. 31, 2016, 10 pages.

U.S. Appl. No. 14/343,587, Office Action dated Jul. 28, 2016, 9 pgs.

PCT International Preliminary Report on Patentability in Application PCT/US2012/056685, dated Mar. 25, 2014, 6 pgs.

* cited by examiner

COMPOSITE CATHODE SOLID STATE BATTERY

RELATED APPLICATIONS

This application claims the priority to and benefit of U.S. Provisional Application No. 61/933,214, filed Jan. 29, 2014, which application is hereby incorporated by reference.

INTRODUCTION

While lithium batteries are gaining widespread market adoption for consumer electronics, safety and performance challenges remain, particularly for large scale applications such as automotive and grid storage batteries.

For example, some lithium batteries have liquid electrolytes. Liquid electrolyte batteries, however, tend to have performance and safety issues resulting from the use of liquid electrolytes. For example, the compounds in liquid electrolytes may react with a carbon anode during charging to form a solid electrolyte interface layer (SEI) that ultimately limits the performance and lifetime of the battery. Further, many of the aprotic organic electrolytes are highly flammable and volatile creating concerns with battery swelling, thermal runaway, and fires.

Other lithium batteries have solid electrolyte layers, which batteries are known as solid state lithium batteries ("SSLBs"). Typically, SSLBs are employed in a thin film format resulting in low capacity due to the low ionic conductivity of the solid state materials. Low cell capacity has resulted in limited market adoption.

Attempts have been made to replace the liquid electrolyte of SSLBs with an ion conductor. However, current manufacturing techniques often result in dramatically decreased ion conductivity within a composite cathode relative to the ion conductor's properties as a pure material.

For example, one current technique to consolidate an ion conductor material is furnace annealing. Furnace annealing, however, uniformly heats all materials within a mixed matrix of a composite cathode and often results in the intermixing of materials and degraded performance of the components and the composite cathode. Lower temperatures may be employed to decrease intermixing. Lowering the temperature, however, leads to incomplete annealing of the particles and poor formation of the resultant battery. These manufacturing challenges results in poor discharge rate behavior, poor cycle life, and low energy density.

It is with respect to these and other considerations that the technology is disclosed. Also, although relatively specific problems have been discussed, it should be understood that the embodiments presented should not be limited to solving the specific problems identified in the introduction.

Composite Cathode Solid State Battery

The present disclosure relates to systems, methods, and devices related to microwave annealing particles in a composite cathode. While embodiments described may relate to cathodes in a solid-state lithium battery, it will be appreciated that the technology described may be used in a variety of settings.

The technology disclosed relates to selectively annealing materials. Aspects of the technology include using microwaves to selectively anneal one or more materials in a composite cathode. For example, an electron conductor material, an ion conductor material, and an intercalation material may be chosen for inclusion in a composite cathode. The inclusion of each of these materials may be determined based at least in part in anticipation of annealing one of the materials in a composite cathode while not annealing the other materials. Particle size, particle shape, particle resistivity, microwave frequency, duration, power, environment temperature and pressure are among the parameters that may be manipulated to promote or deter annealing of materials of the composite cathode.

For example, the technology includes a method of selectively annealing a composite cathode. The method includes providing a composite cathode that includes an intercalation material, an ion conductor material, and an electron conductor material. The method includes selectively annealing a first material within the composite cathode, and after selectively annealing the first material, selectively annealing a second material within the composite cathode.

The technology also includes a system for microwave annealing. The system includes a microwave chamber and a microwave generator. The microwave generator is tunable. A composite cathode may be placed in the microwave chamber. The composite cathode includes an intercalation material, an ion conductor material, and an electron conductor material. The microwave generator is configured to apply a microwave to the composite cathode to selectively anneal at least one of the intercalation material, the ion conductor material, and the electron conductor material.

The technology also includes a solid state battery. The solid state battery includes an anode, an electrolyte, and a composite cathode. The composite cathode includes an intercalation material, an ion conductor material. At least a portion of the ion conductor material forms an ion conducting pathway. Additionally, an electron conductor material is included in the composite cathode. At least a portion of the electron conductor material forms an electron conductor pathway. In an embodiment, the solid state battery has a volumetric energy density of greater than 1000 Wh/L and a cycle life of greater than 1,000 cycles.

BRIEF DESCRIPTION OF THE DRAWINGS

Non-limiting and non-exclusive embodiments are described with reference to the following figures.

DETAILED DESCRIPTION

The technology relates to microwave annealing a composite cathode. By controlling various parameters of the microwave annealing process and the material composition of the composite cathode, the technology allows for the selective annealing of certain particles in the composite cathode. The term selective annealing is used to describe the annealing of one or more particles of a composite cathode selectively such that other particles in the composite cathode do not experience the same temperature increase and/or phase change that the one or more particles experience.

The use of selective annealing of materials in a cathode may be used to improve the composite cathode performance. For example, an electron conductor material may be selectively annealed to form electron conducting pathways that span a composite cathode. By selectively annealing the electron conductor material, and not, for example, other materials in the composite cathode, the resulting electron conducting pathway will remain substantially free from contamination by other materials in the composite cathode. This may be beneficial when it is desired to have an electron conducting pathway free of cross contamination by other materials in the composite cathode.

Further, the technology also relates to stepwise annealing of a composite cathode. Stepwise annealing is first selectively annealing a first material of a composite cathode, and then selectively annealing a second material in the composite cathode. In an embodiment, the second annealing process does not re-melt the first annealed material. For example, one may first anneal an electron conductor material to form electron conducting pathways, and then afterwards anneal an ion conductor material to form ion conducting pathways. Various parameters of the second microwave annealing process may be altered to selectively target the second material. Additionally, one may select the material, shape, and size of each material in the composite cathode so as to assist in the stepwise annealing process.

While the technology discloses selective annealing in the context of annealing like materials of a composite cathode, it will be appreciated that the technology is not so limited so as to exclude selectively annealing together different materials in a composite cathode.

Figure 1:
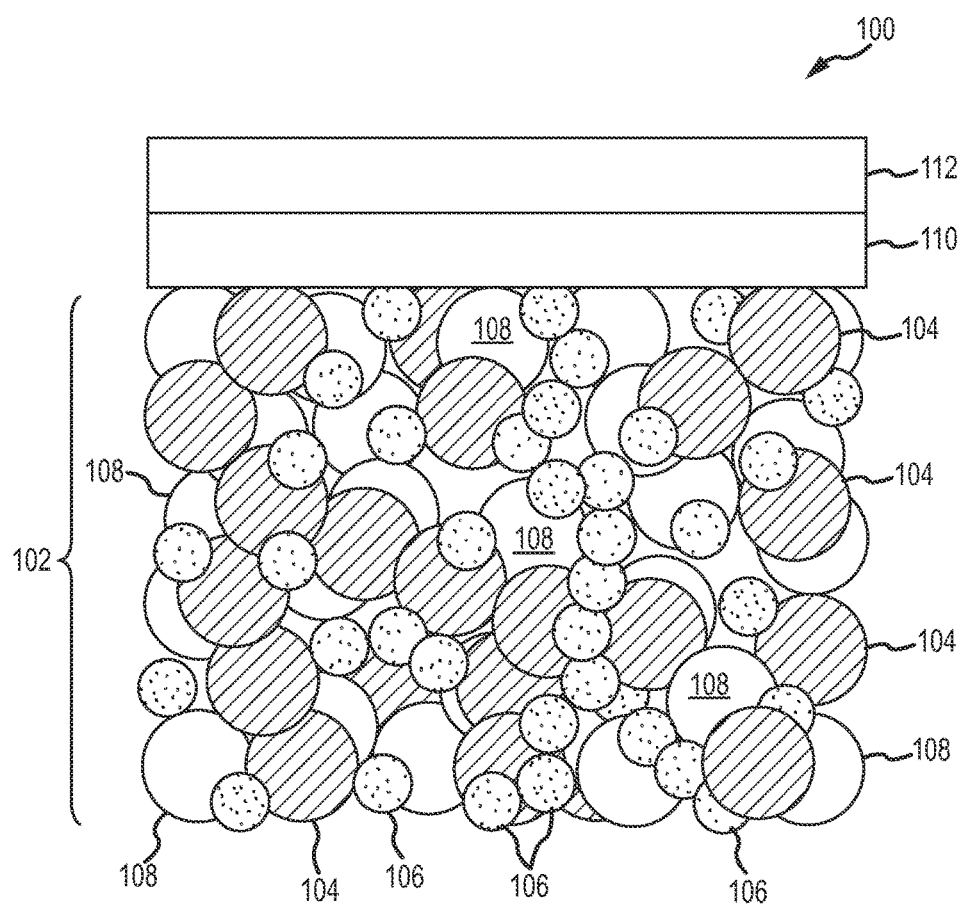
FIG. 1 illustrates an embodiment of a composite cathode.

FIG. 1 illustrates an embodiment of a composite cathode 100 that may be used in the process of microwave annealing. As illustrated, the composite cathode layer 102 includes an electron conductor material 104, an ion conductor material 106, and an intercalation material 108. In an embodiment, each of these materials are all solid state materials. In an embodiment, the composite cathode layer 102 is between 10 and 100 µm. A solid state electrolyte layer 110 may be deposited onto the composite cathode layer 102. Further, an anode layer 112 may be deposited on the electrolyte layer 110.

The composite cathode layer 102 may be formed by tape casting or other slurry based techniques. For example, a slurry of the electron conductor material 104, the ion conductor material 106, and the intercalation material 108 may be mixed. In an embodiment, the slurry is substantially homogenous such that the dispersion of each material is substantially constant throughout the mixture. In other embodiments, the slurry is not homogenous. Instead, the slurry may have varying concentrations of each of the electron conductor material 104, the ion conductor material 106, and the intercalation material 108. The slurry may then be set as is known in the art. Other techniques of forming the composite cathode 102 may be used as is now known or later developed. In an embodiment, the composite cathode 102 has a thickness between 10-200 microns.

As illustrated, the shape of the particles of each of the electron conductor material 104, the ion conductor material 106, and the intercalation material 108 is spherical. In other embodiments, different shapes are used. For example, a cubic shape may be used. Some shapes will affect the way the material reacts to microwave radiation. The shape of the particles of the materials may vary from material to material, and may vary across the same material. For example, the electron conductor material 104 may include some particles that are spherical and some particles that are frustoconical in shape.

Additionally, the size of each of the electron conductor material 104, the ion conductor material 106, and the intercalation material 108 may vary. For example, and as illustrated, the ion conductor material 106 may be smaller than both the intercalation material 108 and the electron conductor material 104. In another embodiment, the ion conductor material 106 is larger than both the intercalation material 108 and the electron conductor material 104. Though FIG. 1 illustrates the electron conductor material 104 and the intercalation material 108 as the same size, they need not be the same size. Further, each particle of a material need not be homogenous in size. For example, certain particles of an intercalation material 108 may be larger than certain particles of the electron conductor material 104, while other particles of the intercalation material 108 may be smaller than other particles of the electron conductor material 104 within the same composite cathode layer 102. Additionally more than one type of intercalation material, ion conductor material, electron conductor material may be present in a composite cathode.

A glass ceramic may be used as the ion conductor material 106. Use of such a material may enhance ion conductivity within the composite cathode layer 102. The glass ceramic may be an oxide. In an embodiment, the ion conductor material 106 has a high electrical conductivity that positively correlates to a high microwave absorption. For example, the ion conductor material 106 may be lithium aluminum germanium phosphate (LAGP). Further, the technology includes the use of $Li_{1.5}Al_{0.5}Ge_1(PO_4)_3$ (LAGP), $Li_{1.3}Al_{0.3}Ti_{1.4}(PO_4)_3$ (LATP), and $Li_7La_3Zr_2O_{12}$ (LLZO) as ion conductors. Multiple types of ion conductor material 106 may be used in the same composite cathode layer 102.

The electron conductor material 104 may be a carbide-based electron conductor. In an embodiment, having a carbide-based electron conductor may also provide mechanical support to the composite cathode layer 102 as well as result in an electron conducting pathway after an annealing process. For example, the electron conductor material 104 may be one of Tungsten Carbide, Silicon Carbide, Titanium Carbide, Zirconium Carbide, of Hafnium Carbide.

The intercalation material 108 is present. In an embodiment, the intercalation material 108 is LiCo2. In other embodiments, the intercalation material may be one of Lithium iron phosphate, Nickel Manganese Cobalt materials (NMC), Nickel Cobalt Aluminum (NCA), Lithium manganese oxides, etc. The intercalation material 108 may be conversion electrodes such as $FeS_2$. The intercalation material may also include Lithium-rich NMC.

As illustrated, an electrolyte layer 110 is disposed on the composite cathode layer 102. For example, the electrolyte layer 110 may be deposited on the composite cathode layer 102. In an embodiment, the electrolyte layer 110 is deposited using any number of techniques including but not limited to physical vapor deposition, chemical vapor deposition, thermal evaporation, pulsed laser deposition, sputter deposition, and/or sol-gel processes. The electrolyte layer 110 may be a solid electrolyte plate. Additionally, the electrolyte layer 110 may be a material with relatively high electrochemical stability when in contact with a lithium anode. For example, the electrolyte layer 110 may be LiPON. LiPON may be deposited with radio-frequency (RF) sputtering from a lithium phosphate target in a nitrogen environment. In an embodiment, the LiPON film may be approximately 1 micron and cover minor surface defects.

An anode 112 is also illustrated. In the embodiment illustrated, an anode 112 is deposited on top of the electrolyte 110. In embodiments, the anode 112 is lithium or another material containing lithium. Lithium may be deposited onto the electrolyte using thermal evaporation. In an embodiment, the lithium layer is between 2-3 microns. In an alternative embodiment, a ~10 micron layer of lithium is plated during charging. In various embodiments the anode 112 itself acts as the contact point. In other embodiments, an anode contact is used as an electrical contact point for the anode 112. In one embodiment the anode contact is nickel, though it can be a variety of conductive materials such as a conductive metal or a conductive paste or ink.

Figure 2A:
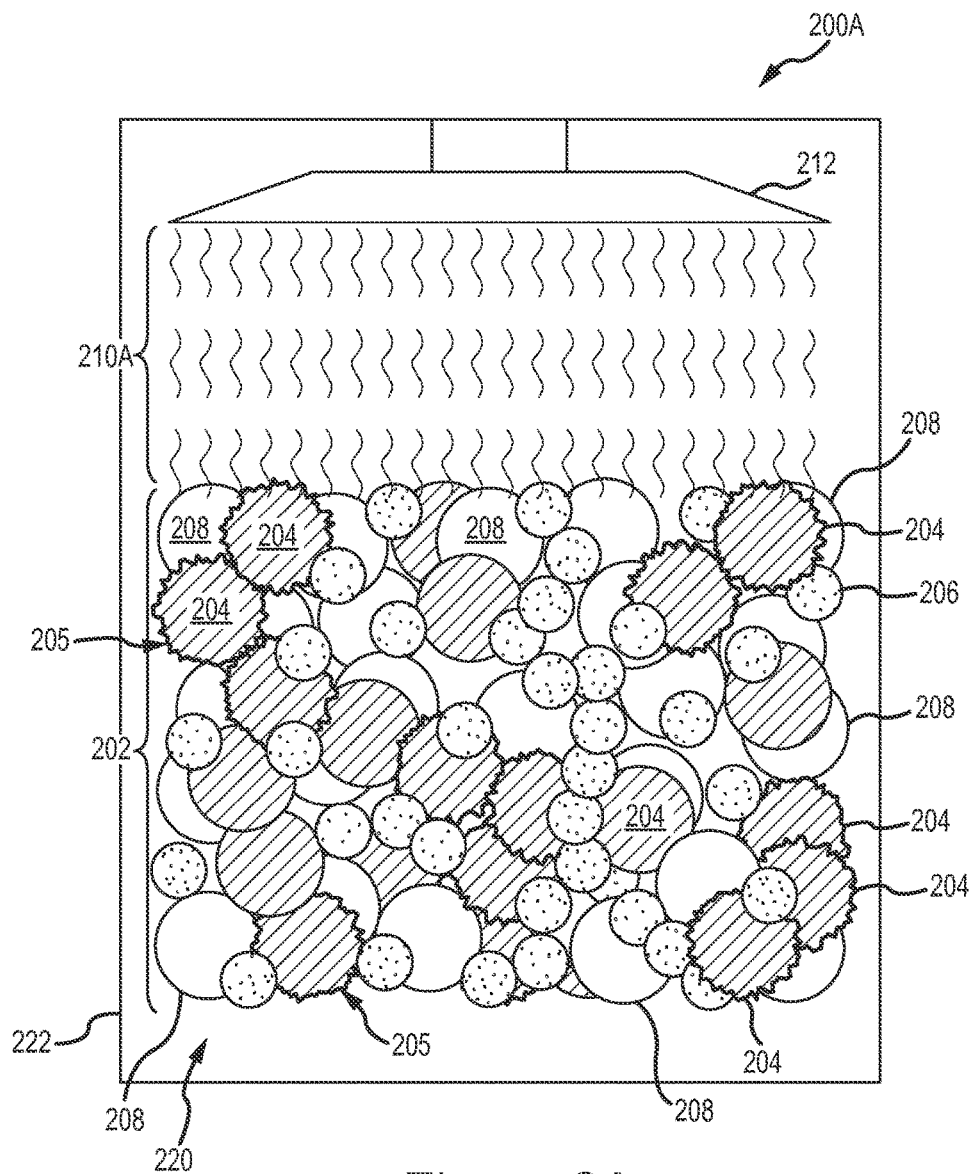
FIG. 2A illustrates an initiation phase of the application of a microwave to a composite cathode.
Figure 2B:
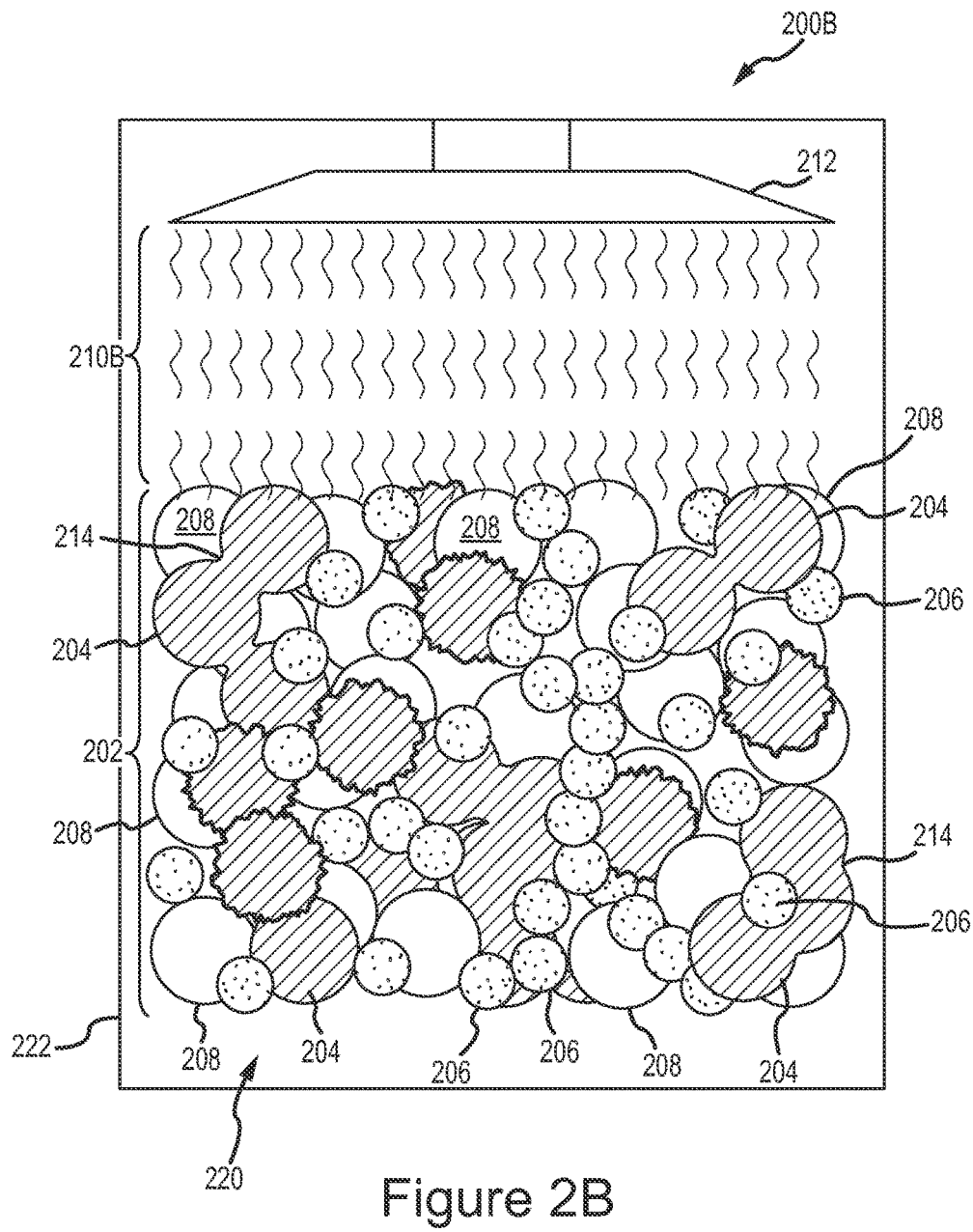
FIG. 2B illustrates the annealing phase of the application of a microwave to a composite cathode.
Figure 2C:
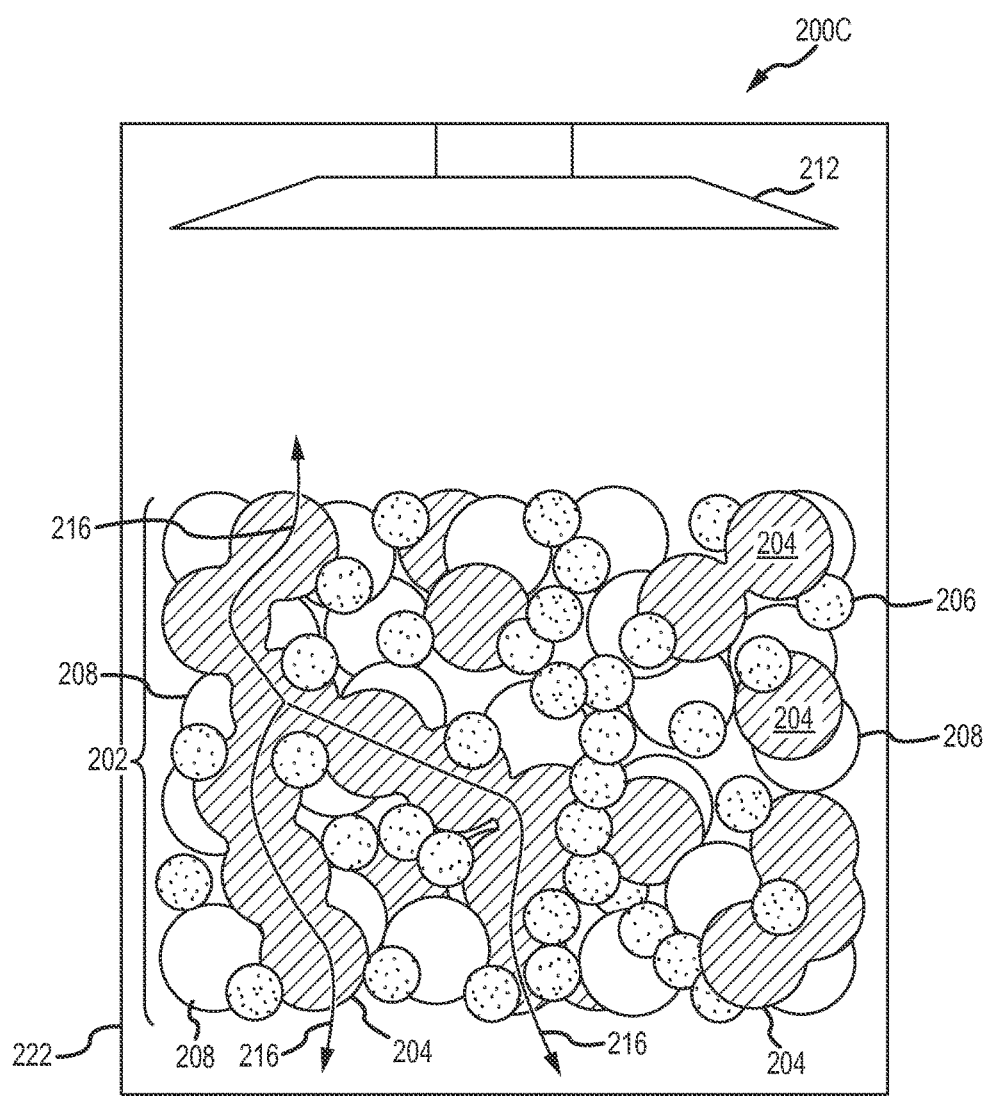
FIG. 2C illustrates the termination phase of the application of microwave to a composite cathode.

FIGS. 2A, 2B, and 2C illustrate various stages of a composite cathode 202 being exposed to a microwave. In an embodiment, such exposure is for the purposes of selectively heating one or more materials of the composite cathode. As illustrated, the composite cathode 202 includes an electron conductor material 204, an ion conductor material 206, and an intercalation material 208. The composite cathode 202 may be the same as or similar to the composite cathode layer referenced in FIG. 1, with like named elements having the same or similar features. For example, the electron conductor material 204, the ion conductor material 206, and the intercalation material 208 may have the same or similar features as like named elements referenced with respect to FIG. 1.

Controlling the selective heating of materials in a composite cathode, such as composite cathode 202, may occur by varying several parameters during initiation and application of the microwave. These parameters include the waveform of the microwave 210A and the microwave 210B, the duration application of the microwave 210A and the microwave 210B, the size of each particle in the composite cathode 202, the relative size of the various particles to other particles in composite cathode 202, the material composition of the composite cathode 202, and the pressure and temperature in the environment 220 in which the microwave 210A and the microwave 210B is applied. Environment 220 may be maintained in a microwave chamber 222.

Microwaves 210A and 210B may be applied to selectively heat one or more particles in a composite cathode 202. In an embodiment, the microwave source 212 is configured to generate microwaves at both 2.45 GHz and 5.8 GHz, or combinations thereof. The microwave source 212 may be configured to create a particular waveform with various pulsing frequencies and illumination frequencies of the microwave 210A and the microwave 210B. For example, microwaves at 2.45 GHz and 5.8 GHz may be pulsed in any variety of sequences to tune the microwaves emitting from the microwave source 212, such as microwave 210A and microwave 210B. Tuning of microwaves may be used to either promote or avoid microwave absorption in individual materials, such as the electron conductor material 204, the ion conductor material 206, and the intercalation material 208.

In an embodiment, increasing the duration of the application of the microwaves, such as microwave 210A and 210B, to particles such as the electron conductor material 204, the ion conductor material 206, and the intercalation material 208, will increase the temperature of the particles. For certain materials, once a particle has reached a certain temperature, however, the rate at which the particle experiences a temperature increase will decline. It is believed that this occurs because the particles that have sintered together do not experience the same increase in temperature with increased exposure to microwaves as much as individual particles. That is, the agglomerated materials will begin to exhibit lower absorption and heating properties than individual material particles. This lower absorption and heating properties is similar to properties of the bulk material.

In an embodiment, particles of a larger size may take longer to reach a given temperature than particles of a smaller size. For some materials, smaller particles will heat faster and to a higher temperature than larger particles at a fixed microwave power. For example, it is believed that because certain particles will anneal together, the annealing of these particles will cause the temperature of the particles to cease increasing, and the behavior of the annealed particles will be similar or the same as the bulk material. As such, the particle size may be varied in order to control which particles in a composite cathode are annealed for a given microwave duration and waveform.

Selection of the material composition of a composite cathode will affect selective annealing. Because materials vary with respect to melting points and electrical resistivity, materials may be selected to promote or deter microwave annealing of one or more materials in the composite cathode in any given step. For example, for certain microwave durations, particle sizes, and microwave waveforms, it is believed that tungsten carbide will anneal together prior to LAGP melting. As such, in an embodiment, tungsten carbide and LAGP are selected as materials of a composite cathode to promote the selective annealing of tungsten carbide. In this case, the carbide material will absorb the microwave energy and experience a temperature and/or phase change. This establishes an electrical conductivity percolation path in cathode. Once the carbide is annealed, the tungsten carbide will not experience the same temperature and phase change for the remainder of the annealing steps. In an embodiment, the composite cathode may then be exposed to a second microwave such that the LAGP will be annealed.

Varying the charge state or oxidation of a material may promote or deter selective absorption of microwaves. For example, the charge state of an intercalation material, such as intercalation material 208, may be varied to slow down the heating of the intercalation material. In an embodiment, $LiCoO_2$ is selected as the intercalation material. It is believed that the microwave absorption frequency will shift depending on the relative amounts of lithium, oxygen, and cobalt in the cathode material. The starting material composition can be chosen to minimize microwave absorption and heating at the frequency used to consolidate other materials within the matrix.

Additionally, the temperature of the environment 220 may be controlled to alter the microwave absorption of materials in the composite cathode 202. For example, microwave absorption of an electron conductor material 204, an ion conductor material 206, and an intercalation material 208 may be altered by controlling the temperature. In an embodiment, increasing the temperature increases the microwave absorption of a relatively weakly absorbing material such as an insulating oxide. A susceptor under the composite cathode may also be used.

Further, the frequency at which a material, including an oxide material, absorbs a relatively high amount of microwave energy (hereinafter known as "Relative Peak Absorption Frequency") is also influenced by the temperature of the environment. Additionally, and depending on the materials chosen, a temperature shift may not cause a uniform shift in the Relative Peak Absorption Frequency for all types of materials in a composite cathode. For example, an increase in temperature may cause a larger shift in the Relative Peak Absorption Frequency for an electron conductor material 204 than the Relative Peak Absorption Frequency for the ion conductor material 206.

Microwaves 210A and 210B may be applied to the composite cathode 202 in a controlled environment 220. For example, the atmosphere may all be controlled and contained within microwave chamber 222. In an embodiment, the environment 220 may include an inert atmosphere such as nitrogen or argon. The pressure of the environment may also be controlled in microwave chamber 222.

With reference to FIG. 2A, FIG. 2A illustrates a microwave initiation phase 200A of the application of a microwave 210A to a composite cathode 202. The microwave 210A is generated from a microwave source 212.

During the microwave initiation phase 200A, the microwave 210A is first applied to the composite cathode 202. In an embodiment, the microwave 210A is tuned to target a particular material. Such tuning may occur by choosing a particular microwave 210A waveform that will heat a particular particle of the composite cathode particle 202 more than other particles in the composite cathode. For example, and as illustrated, the microwave 210A may be tuned to selectively heat the electron conducting material 204. During the initiation phase, the microwave 210A may be pulsed. The microwave 210A may be tuned differently than at other stages of the annealing process.

Selectively heating materials will cause the surface of the material to melt. In an embodiment, electron conducting material 204 is first selectively annealed. Absorption of microwave energy by individual particles of the electron conducting material 204 will cause the surface 205 of at least some of the electron conducting material 204 to begin to melt. As the surface 205 of the particles begins to melt, the particles will begin to melt together.

FIG. 2B illustrates the annealing phase 200B of the application of a microwave 210B to a composite cathode 202. The microwave 210B is tuned so as to selectively anneal one or more particles of the composite cathode 202. The microwave 210B may be the same or different from the microwave that is applied during the initiation phase, such as 210A.

In an embodiment, particles of one material absorb the energy of the microwave 210B selectively so as to cause necking 214 between the particles. Necking 214 occurs when the surface of particles of a material, such as electron conducting material 204, melt sufficiently to anneal together. The application of microwave 210B may continue for a set time.

FIG. 2C illustrates the termination phase 200C of selectively annealing of a material in a composite cathode 202. Termination phase 200C occurs when the composite cathode 202 is no longer exposed to a microwave. The termination phase 200C may occur after a set duration of application phase 200B or after the composite cathode 202 has reached a certain temperature. At the termination phase 200C, selective annealing of one or more materials of a composite cathode may have occurred, such as selective annealing of electron conductor material 204. As illustrated, selective annealing has created an electron conducting pathway 216. The electron conducting pathway 216 provides a pathway for electrons to travel. As illustrated, the electron conducting pathway 216 spans the height of the composite cathode 202. Where additionally layers are disposed on the top and bottom of composite cathode 202, electron conducting pathways 216 that span the height of the cathode will provide a pathway for electrons to move from a bottom layer to a top layer (and vice versa).

Figure 3A:
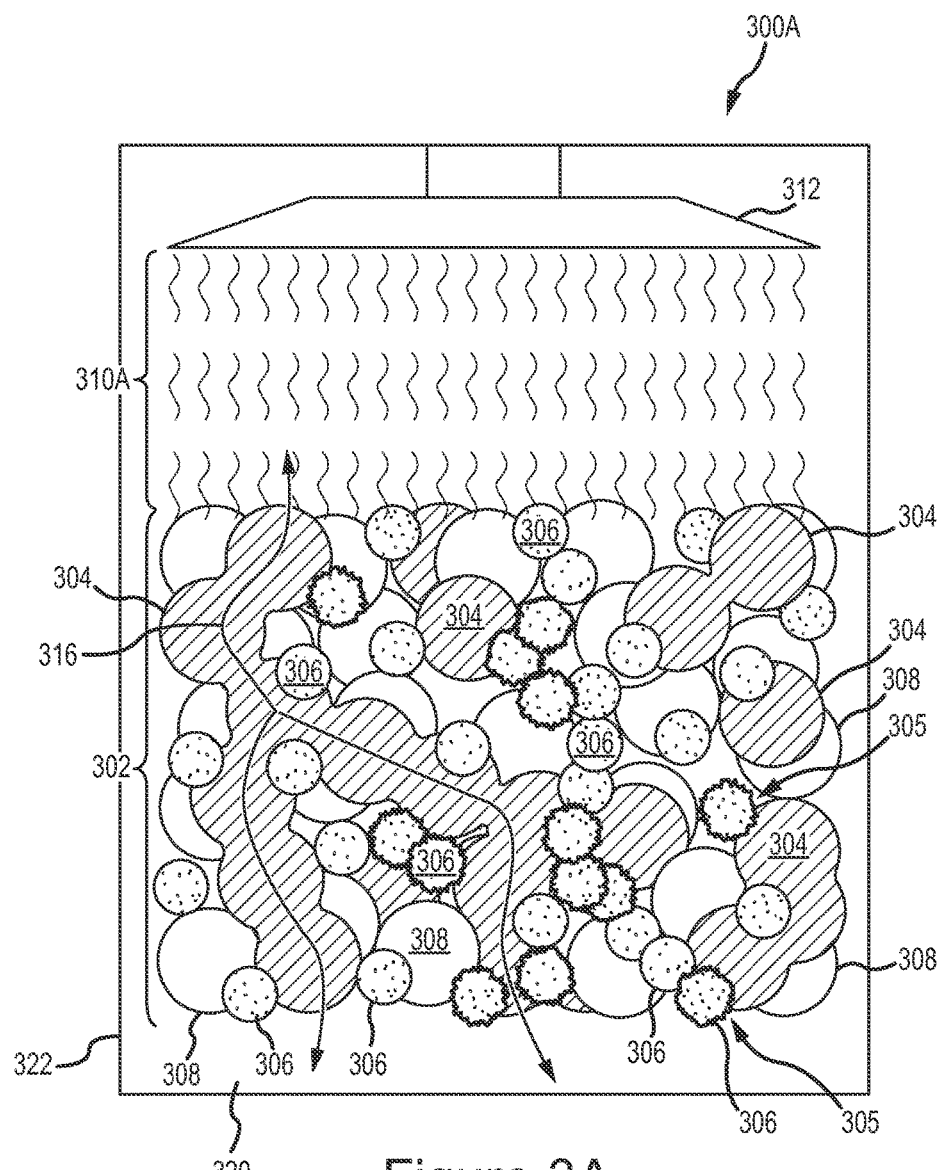
FIG. 3A illustrates the initiation phase of the application of a microwave to a previously annealed composite cathode.
Figure 3B:
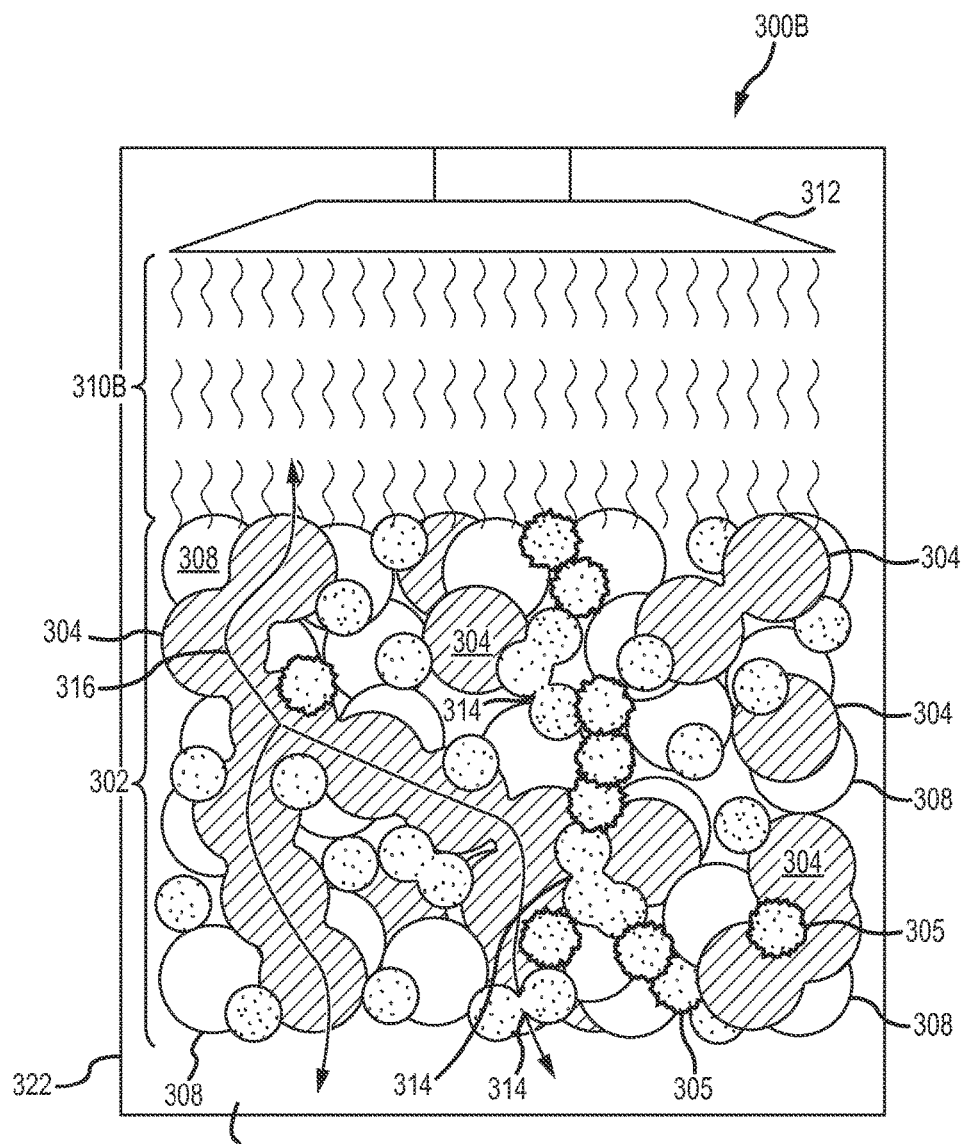
FIG. 3B illustrates the annealing phase of the application of a microwave to a previously annealed composite cathode.
Figure 3C:
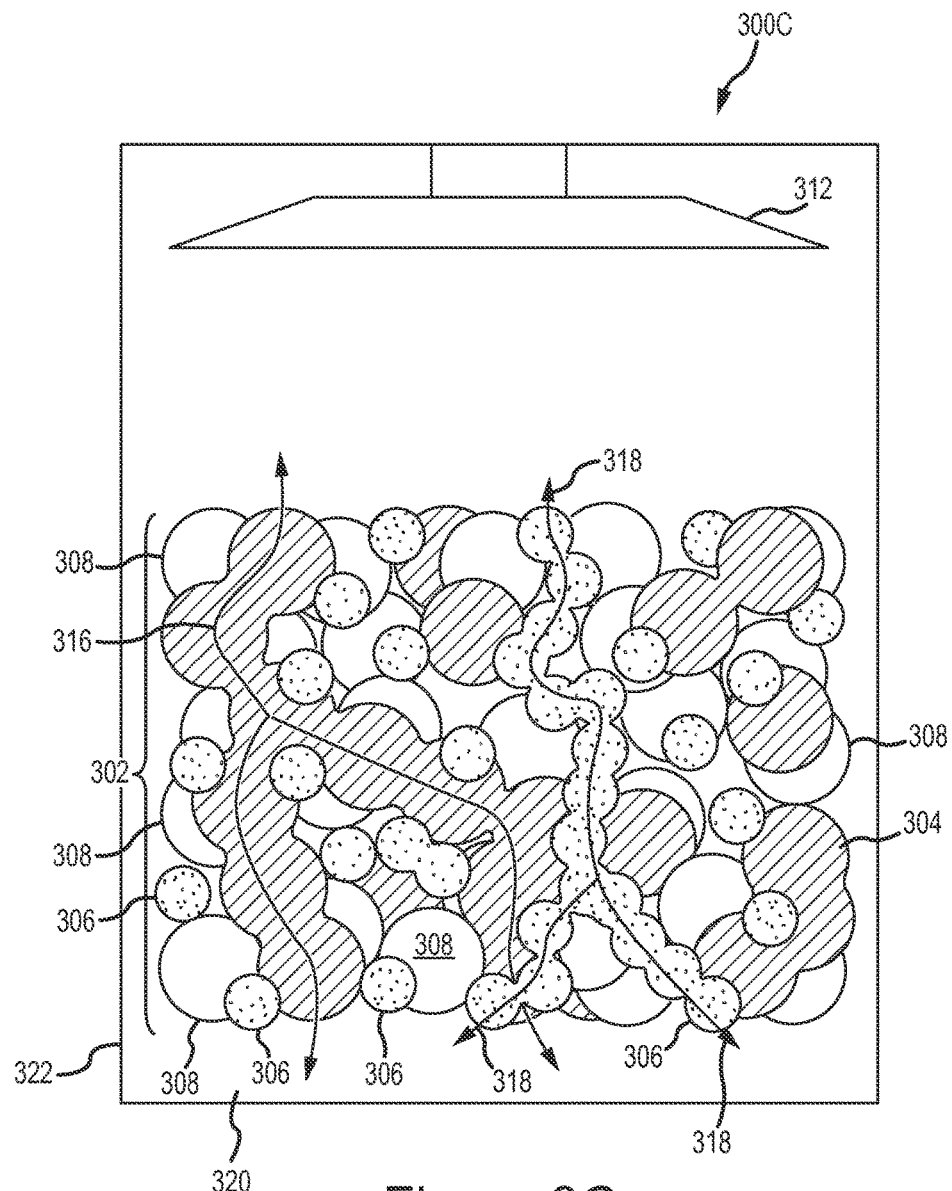
FIG. 3C illustrates the termination phase of the application of microwave to a previously annealed composite cathode.

FIGS. 3A, 3B, and 3C illustrate various stages of a previously annealed composite cathode 302 being exposed to a microwave such as 310A and 310B. In an embodiment, such exposure is for the purposes of selectively heating an additional material in the previously annealed composite cathode 302. As illustrated, the previously annealed composite cathode 302 includes a previously annealed electron conductor material 304 forming electron conducting pathways 316, an ion conductor material 306, and an intercalation material 308. The composite cathode 302 may be the same as or similar to the composite cathode layer referenced above, with like named elements having the same or similar features. For example, the ion conductor material 306 and the intercalation material 308 may have the same or similar features as like named elements referenced with respect to above. Additionally, the previously annealed electron conductor material 304 may have the same or similar features as like named elements reference above, such as an electron conductor material.

As illustrated, the previously annealed electron conductor material 304 provides electron conducting pathways 316 that span the previously annealed composite cathode 302. Where additionally layers are disposed on the top and bottom of previously annealed composite cathode 302, an electron conducting pathway 316 that spans the height of the cathode will provide a pathway for electrons to move from a bottom layer to a top layer. In an embodiment, formation of these previous pathways may occur using the techniques describe with reference to FIG. 2. In another embodiment, the pathways may have formed using another annealing process, such as furnace annealing.

With reference to FIG. 3A, FIG. 3A illustrates a microwave initiation phase 300A of the application of a microwave 310A to a previously annealed composite cathode 302. The microwave 310A is generated from a source 312.

During the microwave initiation phase 300A, the microwave 310A is first applied to the composite cathode 302. In an embodiment, the microwave 310A is tuned to target a particular material. Such tuning may occur by choosing a particular microwave 310A waveform that will heat a particular particle of the previously annealed composite cathode 302 more than other particles in the previously annealed composite cathode 302. For example, and as illustrated, the microwave 310A may be tuned to selectively heat the ion conductor material 306. During the initiation phase, the microwave 310A may be pulsed. Additionally, the microwave 310A may be tuned differently than at other stages of the annealing process.

During the microwave initiation phase 300A, the microwave 310A is first applied to the previously annealed composite cathode 302. The microwave 310A may be tuned such that the application of the microwave 310A to the previously annealed composite cathode 302 does not cause previously annealed electron conductor material 304 to re-melt. For example, in an embodiment where $LiCoO_2$ was previously annealed, and it is desired to anneal LAGP, the microwave 310A may be a waveform that has a frequency to avoid annealing the $LiCoO_2$ during the LAGP annealing step. In an embodiment, the microwave 310A waveform may be changed to couple effectively into the surface of $LiCoO_2$ particles to help reduce the interfacial resistance between the consolidated LAGP and $LiCoO_2$ without negatively impacting the LAGP conductivity.

FIG. 3B illustrates the annealing phase of the application of a microwave to a previously annealed cathode. In an embodiment, particles of one material absorb the energy of the microwave 310B selectively so as to cause heating of the particles. For example, ion conducting material 306 may absorb the microwaves and the particle surface 305 may heat. In an embodiment, particles of one material absorb the energy of the microwave 310B selectively so as to cause necking 314 between the particles. Necking 314 occurs when the surface of particles of a material, such as ion conducting material 306, melt sufficiently to anneal together. The application of microwave 310B may continue for a set time. The microwave 310B may be the same or different from a microwave that is applied during the initiation phase, such as 310A.

FIG. 3C illustrates the termination phase 300C. Termination phase 300C occurs when the previously annealed composite cathode 302 is no longer exposed to a microwave. The termination phase 300C may occur after a set duration of application phase 300B or after the previously annealed composite cathode 302 has reached a certain temperature. At the termination phase 300C, selective annealing of one or more materials of a composite cathode may have occurred, such as selective annealing of ion conductor material 306. As illustrated, selective annealing has created ion conducting pathways 318. The ion conducting pathway 318 provides a pathway for electrons to travel. As illustrated, the ion conducting pathway 318 spans the height of the previously annealed composite cathode 302. Where additionally layers are disposed on the top and bottom of composite cathode 302, an ion conducting pathway 318 that spans the height of the cathode will provide a pathway for ions to move from a bottom layer to a top layer (and vice versa).

Figure 4:
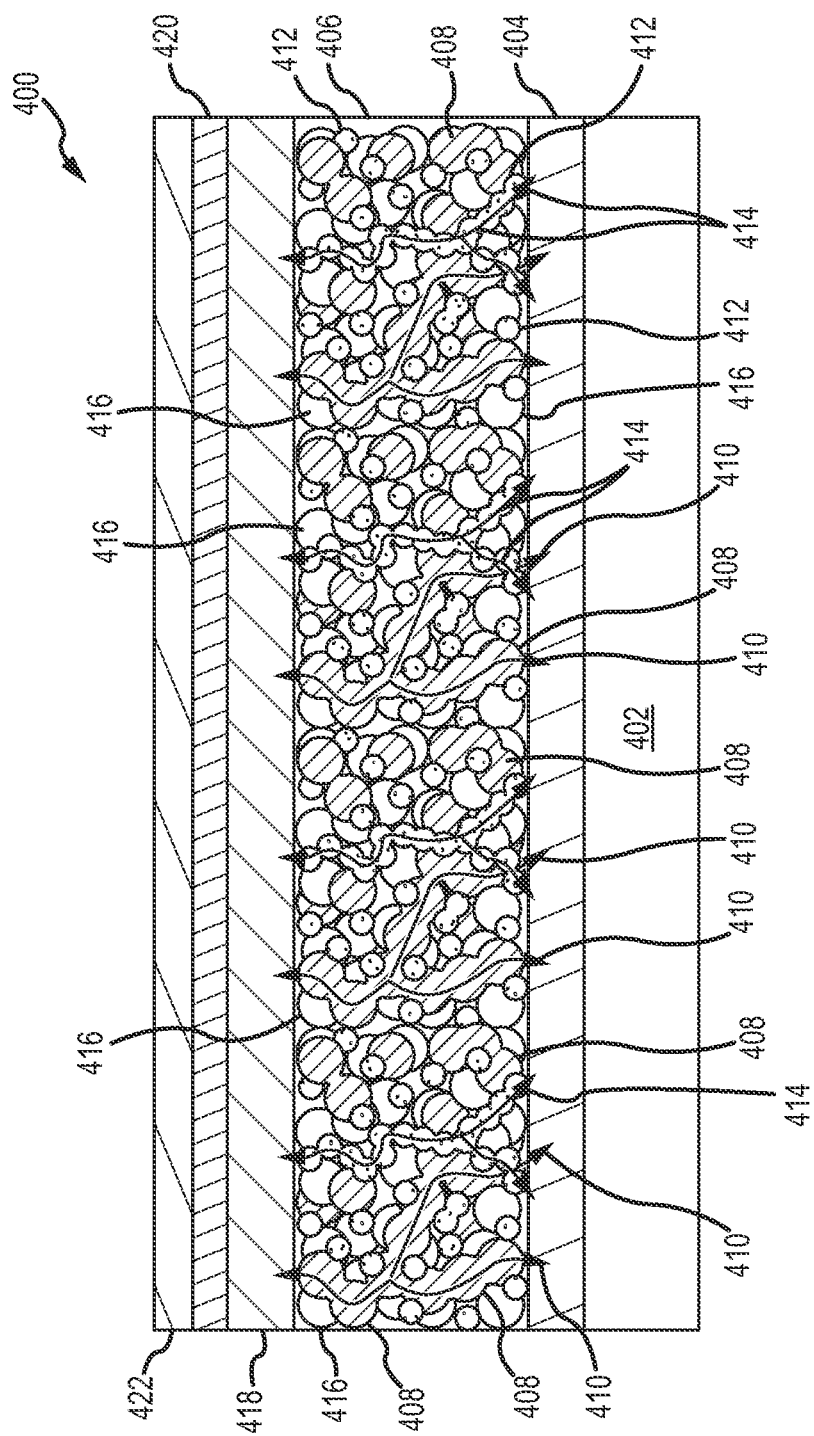
FIG. 4 illustrates a selectively annealed composite cathode.

FIG. 4 illustrates a selectively annealed solid state battery 400 with a selectively annealed composite cathode 404. In an embodiment, the solids state battery 400 includes a substrate 402, to which layers have been added. These layers include a cathode contact layer 404, a selectively annealed composite cathode 406, an electrolyte layer 418, an anode 420, and an anode contact 422.

In embodiments, the substrate 402 layer may be polyethylene terephthalate ("PET"). In other embodiments, the substrate is one of plastic, stainless foil, glass, and ceramic. Any other suitable material now known or later developed may also be used for the substrate 402.

The cathode contact layer 404 may be a variety of conductive materials such as metal (e.g., gold) or a conductive paste or ink.

As illustrated, the selectively annealed composite cathode 406 is disposed (e.g., by casting) on a cathode contact 404. In an embodiment, the selectively annealed composite cathode 406 includes a previously annealed electron conductor material 408 forming electron conducting pathways 410, a previously annealed ion conductor material 412 forming ion conducting pathways 414, and an intercalation material 416. The selectively annealed composite cathode 406 may be the same as or similar to the composite cathodes referenced above, with like named elements having the same or similar features.

An electrolyte 418 separates the selectively annealed composite cathode 406 from the anode 420. Lithium phosphorus oxynitride (LiPON) is an amorphous polymer material that may be used as an electrolyte 418, though any currently known or future material suitable for use as an electrolyte in a thin-film solid state battery may be used.

In the embodiment illustrated, an anode 420 is disposed on the electrolyte 418. The anode 420 may be lithium or another material containing lithium. In various embodiments, the anode 420 acts as the anode contact 422.

In alternative embodiments, a different material is used for the anode contact 422. For example, the anode contact 422 may be nickel or another conductive material such as a metal or a conductive paste or ink.

The selectively annealed solid state battery 400 may be one that has over 10,000 cycles at 100% depth of discharge with minimal capacity fade and operation over a wide temperature range.

Additionally, the selectively annealed solid state battery 400 may have a specific energy density of approximately 300 Wh/kg, a volumetric energy density of approximately 1000 Wh/L, and a cycle life of approximately 1,000 cycles. In other embodiments, the battery may have a specific energy density of approximately 350 Wh/kg, a volumetric energy density of 1100 Wh/L, and cycle life >10,000 cycles. Additionally, the selectively annealed solid state battery 400 may have a 100 μm cathode. In an embodiment, the capacity of a battery with 100 μm cathode is approximately 3.6-4.0 mAh/cm2. In embodiments, the performance of the battery is due in part to a higher concentration of ion conducting pathways and electron conducting pathways, as well as a thicker cathode.

Figure 5:
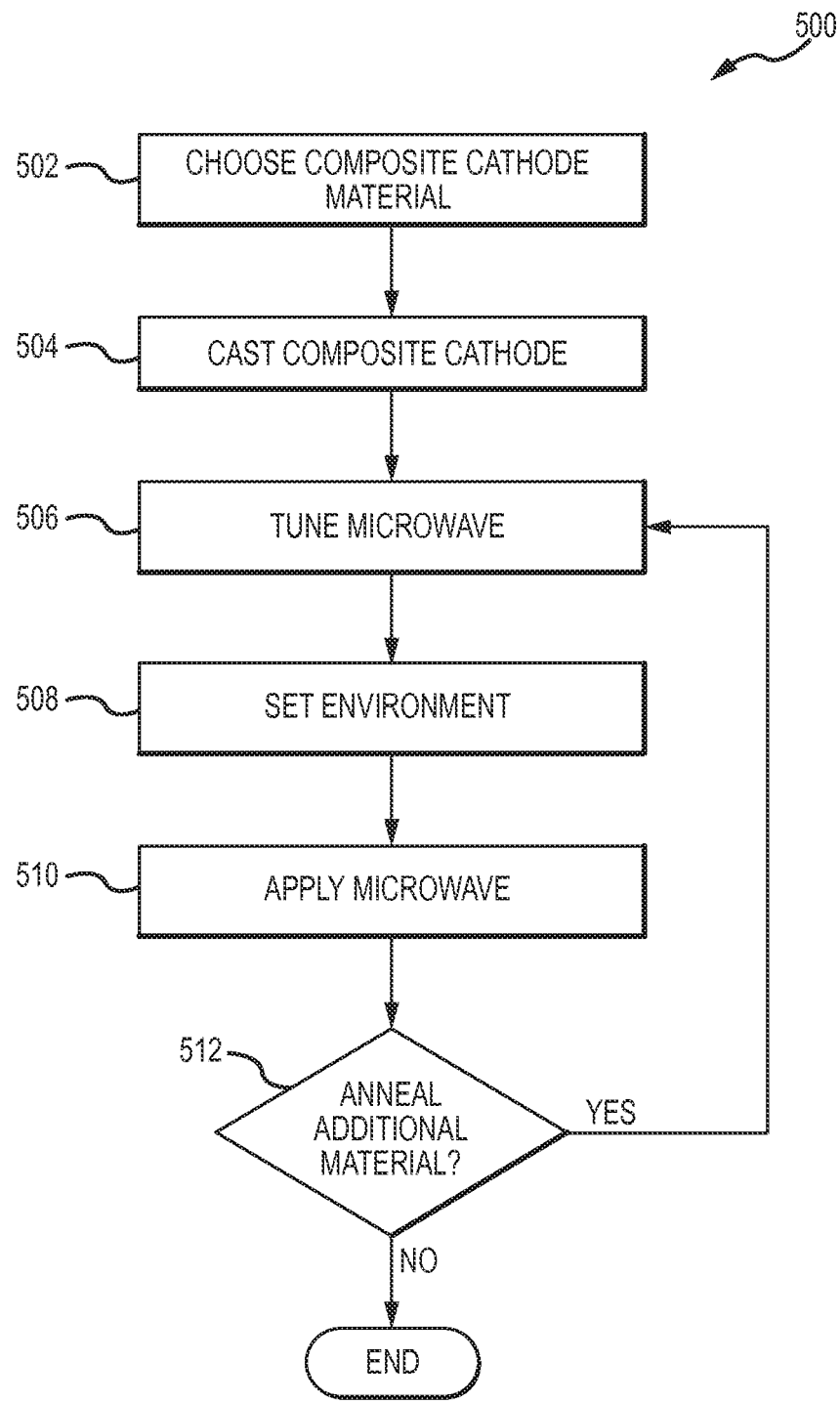
FIG. 5 is a method for selectively annealing a composite cathode.

FIG. 5 illustrates a method 500 for selectively annealing a composite cathode. The method 500 begins with choose composite cathode material operation 502. In operation 502, identification of materials of a cathode, such as an electron conductor material, ion conductor material, and intercalation material occurs. In an embodiment, the particle size and shape of each material is selected. Selection of the cathode material is made to either promote and/or deter the selective annealing of one or more materials of the composite cathode.

The method 500 proceeds to cast composite cathode operation 504. In this operation, the composite cathode is formed. Formation of the composite cathode may occur by tape casting. For example, a slurry of an electron conductor material, an ion conductor material, and an intercalation material may be mixed. In an embodiment, the slurry is substantially homogenous such that the dispersion of each material is substantially constant throughout the mixture. In other embodiments, the slurry is not homogenous. Instead, the slurry may have varying concentrations of each of the electron conductor material, the ion conductor material, and the intercalation material. The slurry may then be set as is known in the art. Other techniques of forming the composite cathode may be used as is now known or later developed. In an embodiment, the composite cathode has a thickness between 50-200 microns.

The method 500 then proceeds to tune microwave operation 506. In operation 506, a microwave waveform is tuned to either promote and/or deter one or more materials of the composite cathode from annealing during the application of a microwave. In an embodiment, tuning the waveform includes selecting one or more of illumination frequencies, pulsing frequency, or duration of one or more waveforms. The waveforms may be then applied to a composite cathode during initiation and application of the microwave to the composite cathode.

Method 500 proceeds to set environment operation 508. In set environment operation 508, the environment that the composite cathode is exposed to will be set. This may including adjusting the temperature, atmospheric makeup, pressure, etc. In an embodiment, setting the environment is done to either promote of deter the selective annealing of one or more materials in a composite cathode.

Method 500 proceeds to apply microwave operation 510. In apply microwave operation 510, a microwave is applied to the composite cathode. The microwave may be applied using a generator. In an embodiment, the waveform and duration of the microwave is determined at tune microwave operation 506. Accordingly, application of the microwave in operation 510 may selectively anneal one or more materials of a composite cathode.

The method 500 then proceeds to determine operation 512, where it is determined whether to selectively anneal an additional material (or re-anneal the same material) in the composite cathode. If it is determined that another material should be selectively annealed (or the same material should be re-annealed), the method 500 returns to step 506, where the microwave is tuned to anneal the additional material.

Thus, this method may be performed multiple times where it is desirous to selectively anneal material in a composite cathode multiple times, or selectively anneal various material of a composite cathode in a step-wise manner.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

What is claimed is:

1. A method of selectively annealing a composite cathode, the method comprising:
   selecting a first particle size of an electron conductor material to assist in sintering of the electron conductor material during an application of a first microwave,
   selecting a second particle size of an ion conductor material to assist in sintering of an ion conductor material during an application of a second microwave,
   providing the composite cathode, the composite cathode comprising a mixture of an intercalation material, the ion conductor material, and the electron conductor material, wherein the ion conductor material comprises particles of ion conducting material at a second particle size, and further wherein the electron conductor material comprises particles of electron conductor material at a first particle size, wherein the first particle size and the second particle size are different;
   after providing the composite cathode, applying the first microwave at a first waveform to the cathode, wherein the first microwave increases the temperature of at least a portion of the electron conductor material within the composite cathode such that the particles of the electron conductor material sinter together to form, in part, at least one electrical conductive percolation path in the cathode; and
   after applying the first microwave at a first waveform to the cathode, applying the second microwave at a second waveform to the cathode, wherein the second microwave increases the temperature of at least a portion of the ion conductor material within the composite cathode such that the particles of the ion conductor material sinter together, wherein the second waveform is different from the first waveform;
   wherein the selection of the second particle size of the ion conductor material is performed in part to deter sintering of the ion conductor material during the application of the first waveform.

2. The method of claim 1, wherein application of the second waveform does not cause the at least one electrical conductive percolation path in the cathode to experience the same temperature change that was experienced during the application of the first waveform.

3. The method of claim 1, wherein the second waveform is different from the first waveform.

4. The method of claim 1, wherein the first microwave waveform includes a first sub-microwave waveform at frequency of 2.45 GHz and a second sub-microwave form frequency of 5.8 GHz.

5. The method of claim 1, wherein the first microwave waveform includes a pulse during the initial application of the first waveform.

6. The method of claim 1, wherein at least a portion of the ion conductor material is $Li_{1.5}Al_{0.5}Ge_1(PO_4)_3$ (LAGP), $Li_{1.3}Al_{0.3}Ti_{1.4}(PO_4)_3$ (LATP), $Li_7La_3Zr_2O_{12}$ (LLZ), or $Li_{0.5}La_{0.5}TiO_3$ (LLT).

7. The method of claim 1, wherein the electron conductor material comprises electron conductor particles that have an average size between 6 μm and 383 μm.

8. The method of claim 1, wherein the temperature to which the at least a portion of the electron conductor material is increased is less than the temperature to which the at least a portion of the ion conductor material is increased.

9. The method of claim 1, wherein the electron conductor material comprises a plurality of tungsten carbide particles and the ion conductor material comprises a plurality of LAGP particles.

* * * * *